(12) United States Patent
Hwang et al.

(10) Patent No.: US 8,845,479 B2
(45) Date of Patent: Sep. 30, 2014

(54) INPUT SHAFT DAMPER OF TRANSMISSION

(75) Inventors: Jae Woong Hwang, Yongin-si (KR); Yong Wook Jin, Suwon-si (KR); Wan Soo Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 59 days.

(21) Appl. No.: 13/487,685

(22) Filed: Jun. 4, 2012

(65) Prior Publication Data
US 2013/0109528 A1    May 2, 2013

(30) Foreign Application Priority Data
Oct. 31, 2011 (KR) .......................... 10-2011-0112030

(51) Int. Cl.
*F16H 57/08* (2006.01)
*F16H 35/12* (2006.01)
*F16F 15/121* (2006.01)

(52) U.S. Cl.
USPC ........................... 475/331; 74/574.4; 464/68.1

(58) Field of Classification Search
USPC ......................................................... 475/331
See application file for complete search history.

(56) References Cited

U.S. PATENT DOCUMENTS

| 5,863,274 A * | 1/1999 | Jackel ........................... 74/574.4 |
| 6,106,430 A | 8/2000 | Peinemann |
| 2008/0153656 A1 * | 6/2008 | Nerstad et al. ................ 475/331 |

FOREIGN PATENT DOCUMENTS

EP    2 317 174 A2    5/2011

* cited by examiner

*Primary Examiner* — Jacob S Scott
(74) *Attorney, Agent, or Firm* — Morgan, Lewis & Bockius LLP

(57) ABSTRACT

An input shaft damper (ISD) of a transmission, may include an inertia body assembly relatively rotatably mounted on an input shaft of the transmission, and a planetary gear set mounted on the input shaft so as to receive and increase a rotational force of the input shaft and output an increased rotational force to the inertial body assembly.

3 Claims, 2 Drawing Sheets

INPUT SHAFT DAMPER OF TRANSMISSION

CROSS-REFERENCE TO RELATED APPLICATIONS

The present application claims priority to Korean Patent Application No. 10-2011-0112030 filed on Oct. 31, 2011, the entire contents of which is incorporated herein for purposes by this reference.

BACKGROUND OF THE INVENTION

1. Field of the Invention

The present invention relates to an input shaft damper of a transmission, and more particularly, to a technology of reducing rattle noise of a transmission by avoiding resonance in a specific RPM region by imparting additional inertia to an input shaft of a transmission.

2. Description of Related Art

As described in the following document, resonance in a specific RPM band causing rattle noise of a transmission without using a dual mass flywheel (DMF) can be efficiently avoided by including an input shaft damper (ISD) configured to mount an inertial plate on an input shaft of a transmission.

However, in order for the ISD to obtain an appropriate effect as described above, large inertia and rigidity need to be provided to the input shaft. In order to provide the large inertia and rigidity to the input shaft by a general method, a volume of the ISD is considerably increased and therefore, the installation position or the space thereof has many restrictions.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an ISD of a transmission capable of remarkably reducing rattle noise due to resonance and solving a problem of an installation space by providing sufficient inertia to an input shaft of a transmission while occupying a relatively less space.

In an aspect of the present invention, an input shaft damper (ISD) of a transmission, may include an inertia body assembly relatively rotatably mounted on an input shaft of the transmission, and a planetary gear set mounted on the input shaft so as to receive and increase a rotational force of the input shaft and output an increased rotational force to the inertial body assembly.

The planetary gear set may include a sun gear rotatably coupled on an outer peripheral surface of the input shaft, a carrier fixed to the input shaft and providing rotational shafts of a plurality of planetary gears engaged with an outer side of the sun gear, and a ring gear engaged with an outer side of the plurality of planetary gears and fixed to a transmission case.

The inertia body assembly may include a hollow shaft fixed to the sun gear and rotatably coupled on an outer peripheral surface of the input shaft, a drive plate mounted in a state in which the rotation of the drive plate is bound to an outer peripheral surface of the hollow shaft, an inertia plate freely rotatably mounted on an outer peripheral surface of the hollow shaft, a damping spring mounted between the drive plate and the inertia plate to buffer a mutual rotational flow therebetween, and a stopper pin mounted to the drive plate and the inertia plate to limit a mutual rotation displacement while securing an axial connection state of the drive plate and the inertia plate.

The sun gear and the hollow shaft are rotatably mounted on the input shaft through a first bearing, and the inertia plate is rotatably coupled with the outer peripheral surface of the hollow shaft through a second bearing.

The sun gear and the hollow shaft are rotatably mounted on the input shaft through a first bush, and the inertia plate is rotatably coupled with the outer peripheral surface of the hollow shaft through a second bush.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
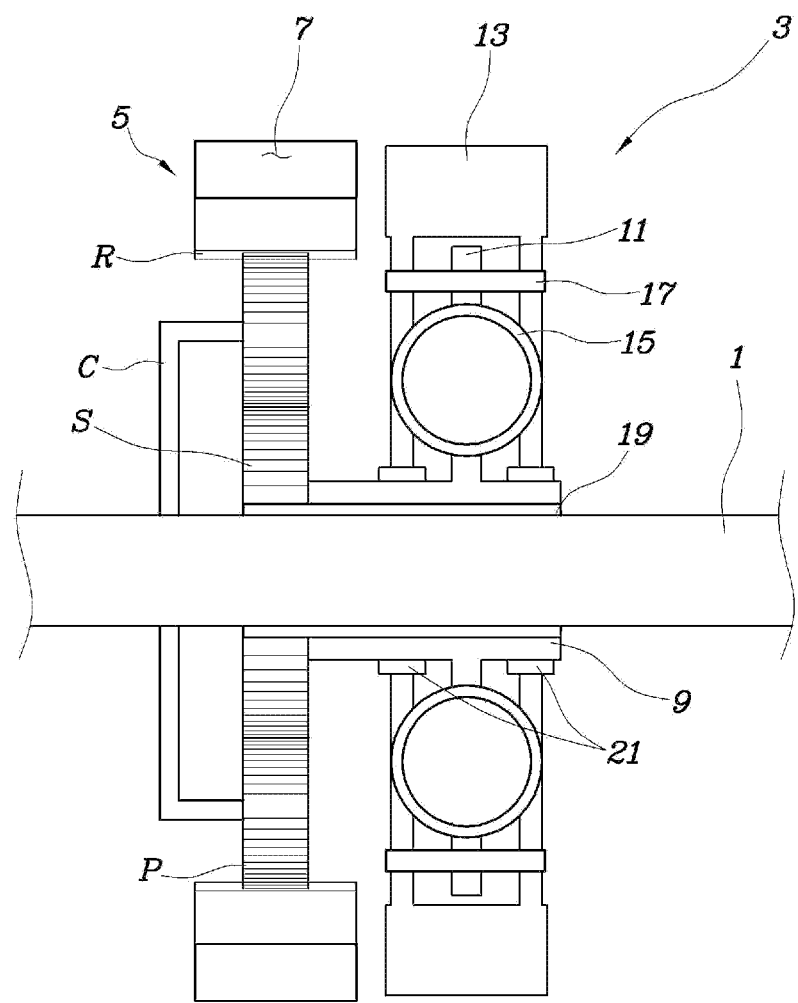
FIG. 1 is a diagram showing a structure of an ISD of a transmission according to the exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with preferred embodiments, it will be understood that the present description is not intended to limit the invention to those preferred embodiments. On the contrary, the invention is intended to cover not only the preferred embodiments, but also various alternatives, modifications, equivalents and other embodiments, which may be included within the spirit and scope of the invention as defined by the appended claims.

Figure 2:
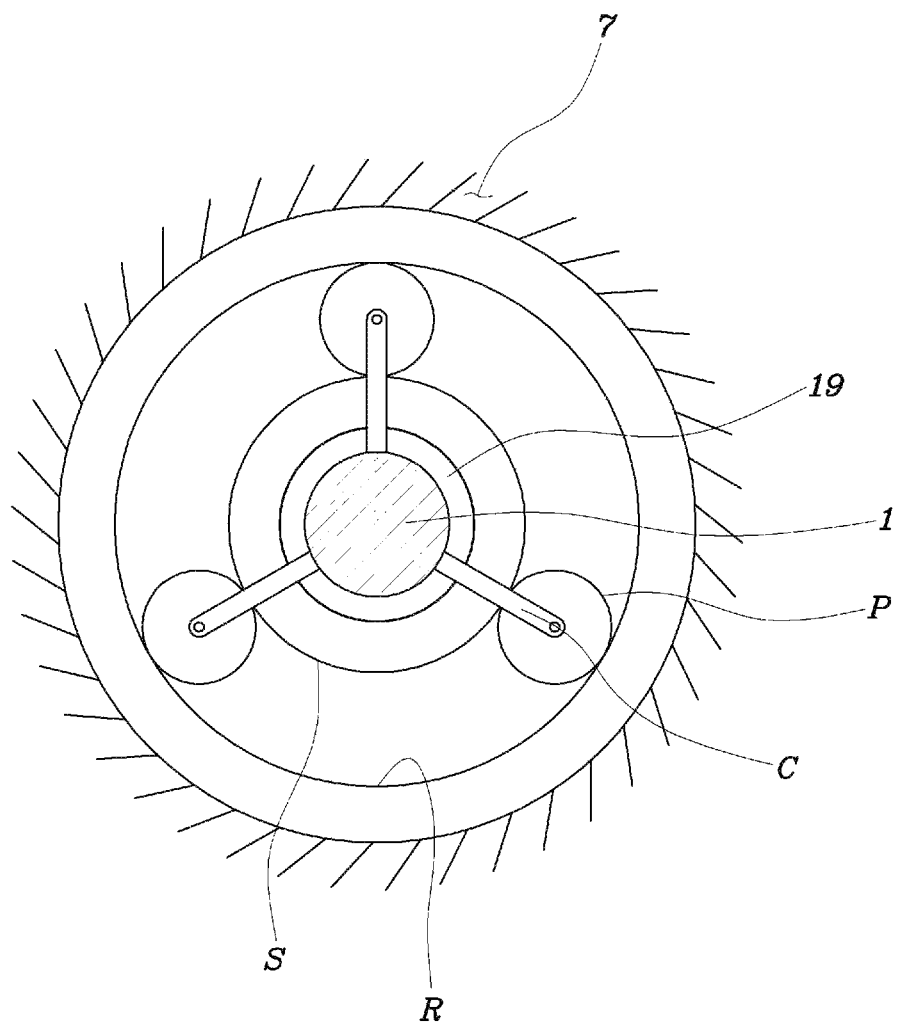
FIG. 2 is a diagram showing a state of a planetary gear device of FIG. 1 as viewed from a side.

Referring to FIGS. 1 and 2, an ISD according to the exemplary embodiment of the present invention is configured to include an inertia body assembly 3 relatively rotatably mounted on an input shaft 1 of the transmission, and a planetary gear set 5 mounted on the input shaft 1 so as to receive and increase a rotational force of the input shaft 1 and output the increased rotational force to the inertial body assembly 3.

That is, unlike the related art, the exemplary embodiment of the present invention separates the inertial body assembly 3 imparting inertia to the input shaft 1 from the input shaft 1 so as to be in a rotatable state and increases the rotational force of the input shaft 1 through the planetary gear set 5 and then, provides the increased rotational force to the inertia body assembly 3, thereby applying a torque increased according to a gear ratio of the planetary gear set 5 to the input shaft 1 from the inertia body assembly 3. Therefore, the exemplary embodiment of the present invention can obtain the inertial increase effect several times greater than the case in which the simple inertia body assembly 3 of the related art corresponding to the volume occupied by the inertia body assembly 3 and the planetary gear set 5 is directly connected to the input shaft 1.

The planetary gear set 5 is configured to include a sun gear S integrally connected with the inertia body assembly 3 and rotatably inserted into an outer side of the input shaft 1, a carrier C providing rotational shafts of a plurality of planetary gears P engaged with the outer side of the sun gear S and integrally connected with the input shaft 1, and a ring gear R engaged with the outer side of the plurality of planetary gears and fixed to a transmission case 7.

The inertia body assembly 3 is configured to include a hollow shaft 9 integrally connected with the sun gear S and rotatably inserted into an outer peripheral surface of the input shaft 1, a drive plate 11 mounted in a state in which the rotation of the drive plate 11 is bound to the outer peripheral surface of the hollow shaft 9, an inertia plate 13 freely rotatably mounted on the outer peripheral surface of the hollow shaft 9, a damping spring 15 mounted to buffer the mutual rotational flow between the drive plate 11 and the inertia plate 13, and a stopper pin 17 mounted to limit a mutual rotation displacement while securing an axial connection state of the drive plate 11 and the inertia plate 13.

The sun gear S and the hollow shaft 9 are rotatably inserted in the input shaft 1 through a first bearing 19 and the inertia plate 13 is rotatably coupled with the outer peripheral surface of the hollow shaft 9 through the second bearing 21.

In addition, the first bearing 19 and the second bearing 21 are each replaced with a bush and may be configured to include a first bush mounted between the input shaft 1 and the sun gear S and the hollow shaft 9 and a second bush mounted between the hollow shaft 9 and the inertia plate 13.

The inertia body assembly 3 has the same concept as the input shaft damper (ISD) of the related art and performs both of the function of avoiding the resonance in the specific RPM band by allowing the inertia body assembly to change the inertia of the input shaft 1 of the transmission and the function of absorbing and disappearing the rotational vibration input from an engine by allowing the drive plate 11 and the inertia plate 13 to form a mutual displacement in a rotational direction, having the damping spring 15 disposed therebetween, as described above.

Further, the inertia body assembly 3 may be configured to further improve the absorbing performing of the rotational vibration by forming hysteresis between the drive plate 11 and the inertia plate 13 due to a friction force generated therebetween.

As described above, the ISD of the transmission according to the exemplary embodiment of the present invention is configured to receive the rotational inertia torque increased according to the gear ratio of the planetary gear set 5 from the inertia body assembly 3 connected to the sun gear S by being integrally connected with the input shaft 1 with the carrier C of the planetary gear set 5 fixed to the ring gear R, thereby increasing the rotational inertia of the input shaft 1 at least 3 to 4 times greater than the case in which the ISD fixed to the input shaft 1 is simply configured in a space occupied by the inertia body assembly 3 and the planetary gear set 5 as in the related art.

Therefore, the ISD is configured in a narrower space, thereby reducing the resonant point to a level in which the dual mass flywheel is mounted in the engine under the same conditions while improving the freedom of design of the power train.

As set forth above, the exemplary embodiments of the present invention can remarkably reduce the rattle noise due to the resonance and solve the problem of the installation space of the ISD by providing the sufficient inertia to the input shaft of the transmission while occupying the relatively less space.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An input shaft damper (ISD) of a transmission, comprising:
    an inertia body assembly relatively rotatably mounted on an input shaft of the transmission; and
    a planetary gear set mounted on the input shaft so as to receive and increase a rotational force of the input shaft and output an increased rotational force to the inertial body assembly;
    wherein the planetary gear set includes a sun gear rotatably coupled on an outer peripheral surface of the input shaft;
    wherein the inertia body assembly includes:
        a hollow shaft fixed to the sun gear and rotatably coupled on an outer peripheral surface of the input shaft;
        a drive plate mounted in a state in which the rotation of the drive plate is bound to a central portion of an outer peripheral surface of the hollow shaft;
        an inertia plate freely rotatably mounted on outward portions of the outer peripheral surface of the hollow shaft;
        a damping spring mounted between the drive plate and the inertia plate to buffer a mutual rotational flow therebetween; and
        a stopper pin mounted to the drive plate and the inertia plate to limit a mutual rotation displacement while securing an axial connection state of the drive plate and the inertia plate; and
    wherein the sun gear and the hollow shaft are rotatably mounted on the input shaft through a first bearing; and
    wherein the inertia plate is rotatably coupled with the outer peripheral surface of the hollow shaft through a second bearing.

2. The ISD of the transmission of claim 1, wherein the planetary gear set further includes:
a carrier fixed to the input shaft and providing rotational shafts of a plurality of planetary gears engaged with an outer side of the sun gear; and
a ring gear engaged with an outer side of the plurality of planetary gears and fixed to a transmission case.

3. An input shaft damper (ISD) of a transmission, comprising:
an inertia body assembly relatively rotatably mounted on an input shaft of the transmission; and
a planetary gear set mounted on the input shaft so as to receive and increase a rotational force of the input shaft and output an increased rotational force to the inertial body assembly;
wherein the planetary gear set includes a sun gear rotatably coupled on an outer peripheral surface of the input shaft;
wherein the inertia body assembly includes:
a hollow shaft fixed to the sun gear and rotatably coupled on the outer peripheral surface of the input shaft;
a drive plate mounted in a state in which the rotation of the drive plate is bound to a central portion of an outer peripheral surface of the hollow shaft;
an inertia plate freely rotatably mounted on outward portions of the outer peripheral surface of the hollow shaft;
a damping spring mounted between the drive plate and the inertia plate to buffer a mutual rotational flow therebetween; and
a stopper pin mounted to the drive plate and the inertia plate to limit a mutual rotation displacement while securing an axial connection state of the drive plate and the inertia plate;
wherein the sun gear and the hollow shaft are rotatably mounted on the input shaft through a first bush; and
wherein the inertia plate is rotatably coupled with the outer peripheral surface of the hollow shaft through a second bush.

* * * * *